United States Patent [19]

Umeda et al.

[11] Patent Number: 4,775,896
[45] Date of Patent: Oct. 4, 1988

[54] IMAGE RECORDING APPARATUS

[75] Inventors: Toshikazu Umeda, Hachioji; Masaharu Nonaka, Tokyo; Hideyuki Handa; Yoshiyuki Ishimitu, both of Hino, all of Japan

[73] Assignee: Konishiroku Photo Industry Co., Ltd., Japan

[21] Appl. No.: 893,490

[22] Filed: Aug. 5, 1986

[30] Foreign Application Priority Data

Aug. 8, 1985 [JP] Japan ............................. 60-173319
Aug. 8, 1985 [JP] Japan ............................. 60-173320

[51] Int. Cl.⁴ ............................................. H04N 1/40
[52] U.S. Cl. ................................. 358/298; 358/283
[58] Field of Search ................. 358/283, 296, 298; 346/107 R, 108, 109

[56] References Cited

U.S. PATENT DOCUMENTS

| 4,368,491 | 1/1983 | Saito ............................. 358/298 X |
| 4,445,125 | 4/1984 | Scifres et al. ................. 358/302 X |
| 4,613,877 | 8/1986 | Spencer et al. ..................... 346/160 |
| 4,639,070 | 1/1987 | Yip et al. ..................... 358/296 X |

FOREIGN PATENT DOCUMENTS

| 91074 | 6/1982 | Japan ............................. 358/298 |
| 182863 | 9/1985 | Japan ............................. 358/298 |
| 250774 | 12/1985 | Japan ............................. 358/298 |

Primary Examiner—Clifford C. Shaw
Attorney, Agent, or Firm—Jordan B. Bierman

[57] ABSTRACT

An image recording apparatus of the invention records an image on a recording medium by a scanning means which performs deflective scanning with light intensity-modulated in accordance with a recording signal. On-line image data is recorded by performing the deflective scanning a plurality of times. The recorded image has a larger number of gray levels than the number of modulation levels.

18 Claims, 7 Drawing Sheets

MAIN SCANNING DIRECTION →

SUB SCANNING DIRECTION ↓

FIG. 12(b)

SCANNING CENTER LINE

FIG. 12(c)

(INTERMITTENT)

FIG. 12(d)

(CONTINUOUS)

FIG. 13(a)

MAIN SCANNING START POSITION

FIG. 13(b)

MAIN SCANNING END

FIG. 13(c)

STATE OF JITTER AT MAIN SCANNING END IN THIS EMBODIMENT

IMAGE RECORDING APPARATUS

FIELD OF THE INVENTION

The present invention relates to an image recording apparatus for recording an image by scanning with an optical beam.

BACKGROUND OF THE INVENTION

In an image recording apparatus of this type, a beam emitted from a light source, such as a laser light source, is modulated in accordance with a recording signal and is incident on a rotational polygon mirror, is reflected by a reflecting surface of the polygon mirror to perform horizontal scanning (main scanning), and is incident on a recording medium to perform recording.

Figure 1:
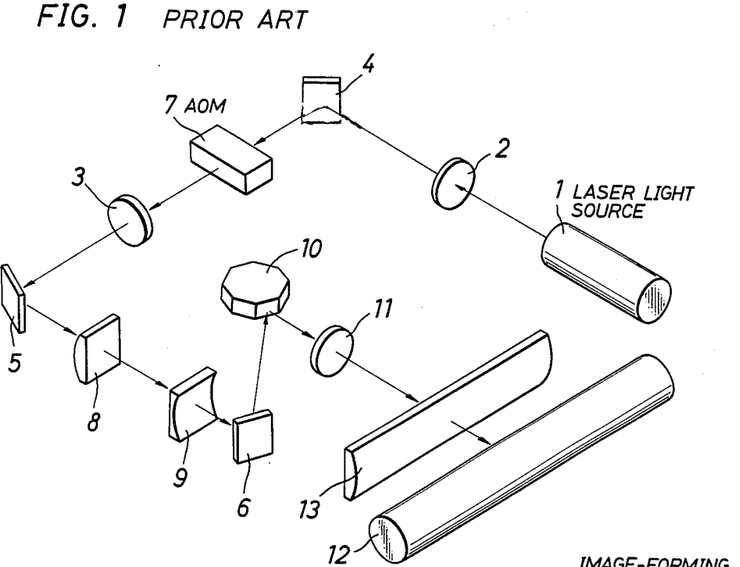
FIG. 1 is a schematic diagram of an optical system of a conventional image recording apparatus.

FIG. 1 is a schematic diagram of a recording optical system of a conventional image recording apparatus. The apparatus has a laser light source 1, beam expanders 2 and 3, mirrors 4, 5, and 6, an acoustic wave optical modulator (to be referred to as an AOM hereinafter) 7, cylindrical lenses 8 and 9 for outputting beams having substantially circular beam spots, a rotational polygon mirror 10, an $f\theta$ lens 11 as a focusing means, and a recording medium 12 such as a photosensitive member.

When a halftone image is recorded by a gray scale method with the above image recording apparatus, the digital data of each pixel of an original is converted into an analog signal by a D/A converter, the light beam is intensity-modulated (light amount control) by the analog signal, and recording is performed, thereby reproducing the density of the original. This method can be adopted when a relationship between an energy supplied to the recording medium and the recording density (H-D characteristics) is comparatively linear. As a recording medium providing linear H-D characteristics, a photosensitive material such as a film or print paper is currently available. In an ink-jet printer or a thermal printer, recording is performed mainly in accordance with an area change method.

In recording using the conventional gray scale method, modulation levels equal in number to gray levels must be used. For this reason, since the number of gray levels is determined by the number of bits of a D/A converter, a D/A converter having a large number of bits is needed in order to obtain a large number of gray levels.

In the rotational polygon mirror as a scanning means used in the image recording apparatus of this type, an error in the parallel degree of each reflecting surface with respect to its rotating axis, i.e., an inclination angle error exists. This error causes an error in the main scanning pitch.

If a high-precise rotational polygon mirror having substantially no error is used, such a problem is solved. In this case, however, a very high performance is required for the rotational polygon mirror. In binary image recording, if an allowable pitch error is suppressed to 20 μm, the inclination angle error is about 7 seconds when f=300 mm, which are the practical limitations when considering the manufacturing cost. In halftone image recording, the pitch error must be suppressed below 1 μm. In this case, the inclination angle error is below 0.5 second, which is, technically, almost impossible to realize.

In another method, a galvanometer mirror is used as a scanning means. In this case, scanning is performed by reciprocally rotating a single mirror. Although an inclination angle error does not occur due to its operation principle in this case, the scanning speed is comparatively lower than the rotational polygon mirror, and the scanning angle cannot be widened as compared to the rotational polygon mirror. Since a considerable jitter is generated, an encoder must be used in some cases. In addition, the galvanometer has an error called a wobble, which causes an adverse effect in halftone image recording.

In order to solve the above problems, an elongated cylindrical lens 13 is conventionally arranged in the main scanning direction between the $f\theta$ lens 11 as the focusing means and the recording medium (photosensitive material in FIG. 1) 12, as shown in FIG. 1, in order to correct the inclination angle error. The cylindrical lenses 8 and 9 are also arranged on the input optical path of the rotational polygon mirror 10 in order to shape the beam to have a substantially circular beam spot on the recording medium 12.

Figure 2:
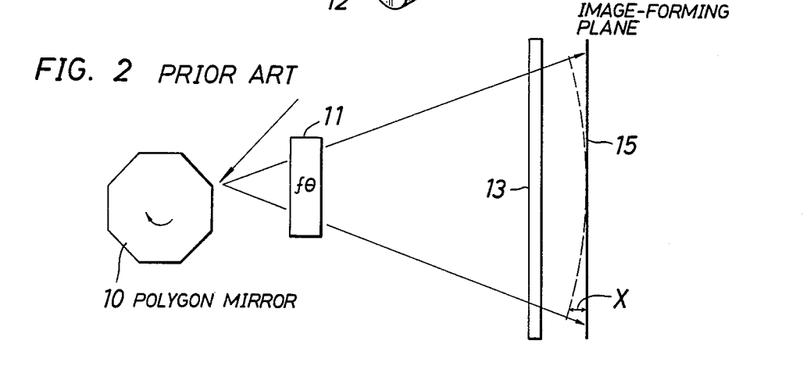
FIG. 2 is a view for explaining an inclination angle error correction by the conventional image recording apparatus.

However, the correction method with the arrangement shown in FIG. 1 requires an expensive correcting optical system. The elongated cylindrical lens is especially expensive. In addition, the image surface corrected by this method is curved (as indicated by a broken line) as shown in FIG. 2. A complete inclination angle correction for the entire main scanning surface cannot thus be performed. The curved degree of the image surface is normally about 3 to 4 mm, although it varies according to each optical system. A gap X is thus formed between the image surface and an image-forming plane 15. In halftone image recording, even a curvature of this degree is visually recognized as a pitch error resulting from an inclination angle error. Furthermore, in this correcting method, the correcting cylindrical lens 13 is often arranged comparatively in the vicinity of the image-forming plane 15, and the beam is thus incident on it with a small spot size. Therefore, dust or the like on the lens 13 tends to influence the recording quality and thus leads to a degradation in image quality. This influence is enhanced when a plastic lens is used for cost savings. Regarding adjustment of the cylindrical lens arrangement, it is difficult to perform rotational adjustment of the cylindrical lenses 8 and 9 in the beam incident side of the rotational polygon mirror about their optical axes. It is also difficult to perform adjustment of the cylindrical lens 13 in the beam output side of the rotational polygon mirror along its optical axis.

SUMMARY OF THE INVENTION

It is an object of the present invention to provide a halftone image recording apparatus which can express a halftone image with a number of modulation levels smaller than the number of gray levels to be obtained, so that a large number of gray levels can be expressed with a D/A converter having a smaller number of bits.

It is a second object of the present invention to provide an image recording apparatus which can record an image whose pitch error due to an inclination angle error does not stand out at a low cost and with a good image quality using a simple arrangement.

BRIEF DESCRIPTION OF THE INVENTION

FIG. 12 shows recording results of a character dot pattern, in which.

DETAILED DESCRIPTION OF THE INVENTION

Figure 3:
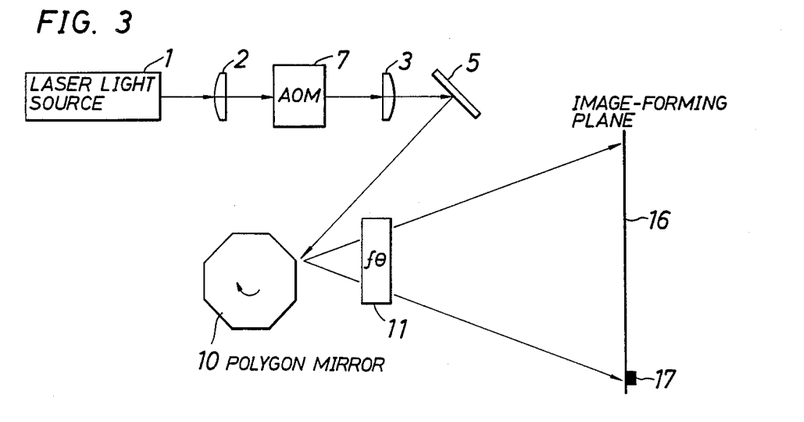
FIG. 3 is a schematic diagram of an image recording apparatus according to an embodiment of the present invention.

The first embodiment of the present invention will now be described. FIG. 3 shows a recording optical system of the first embodiment of the present invention. A beam emitted from a laser light source 1 is shaped by a beam expander 2 to have a predetermined beam spot, and is incident on an AOM 7.

The AOM 7 modulates the intensity of the incident light in accordance with an electric data signal supplied thereto. The modulation band $\Delta f$ of the AOM 7 is expressed as follows:

$$\Delta f = 0.54 \times v/d \qquad (1)$$

where v is the propagation speed of an acoustic wave and d is the incident beam spot size.

The beam modulated by the AOM 7 is converted into a parallel beam by another beam expander 3. Note that the beam expanders 2 and 3 constitute a beam enlarging system. The size of the beam emitted by the laser light source 1 is enlarged by the two expanders 2 and 3.

The beam output from the beam expander 3 is reflected by a mirror 5, and is incident on a rotational polygon mirror 10 to perform horizontal scanning (in the main scanning direction), and then on an f$\theta$ lens 11. The f$\theta$ lens 11 has a function to allow the beam to form an image at a position proportional to its incident angle. As a result, constant-speed scanning proportional to the rotating angle of the rotational polygon mirror 10 can be performed. In this case, the height l of an image is:

$$l = f \times \theta \qquad (2)$$

where f is the focal length and $\theta$ is the incident angle.

Figure 4:
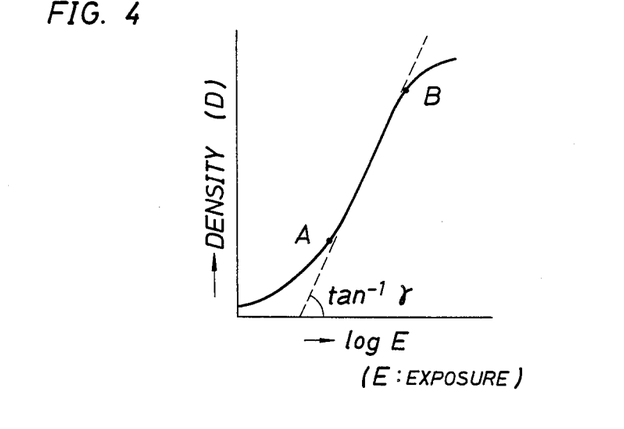
FIG. 4 is a graph showing a relationship (H-D characteristics) between an energy to be supplied to a recording medium and a recording density.

A recording medium (e.g., a photosensitive film or a photosensitive drum; in this embodiment, a photosensitive film) is placed on an image-forming plane 16. The recording medium on the image-forming plane 16 is moved in a direction perpendicular to the plane of the sheet of FIG. 3, thereby performing subscanning. In this case, recording is performed to maintain comparatively linear H-D characteristics. The linear H-D characteristics correspond to the region between points A and B on the curve shown in FIG. 4. In this case, the slope of the characteristic curve is referred to as $\gamma$ value. Note that energy H is denoted by logE in FIG. 4.

The shift speed (subscanning speed) of a recording medium is conventionally set to a value for moving it for a distance corresponding to the pixel size in the subscanning direction during one main scanning. However, in the first embodiment, the shift speed of the recording medium is set to a value for moving it for a distance corresponding to the pixel size in the subscanning direction during one rotation of the rotational polygon mirror 10.

The pixel size in the subscanning direction here means (recording length in the subscanning direction)/(number of pixels in the subscanning direction).

A subscanning speed v (mm/sec) is conventionally set as:

$$v = (P/60).n.A. \qquad (3)$$

where P (rpm) is the rotational frequency of the rotational polygon mirror 10, n is the number of the reflecting surfaces, and A (mm) is the pixel size in the subscanning direction. However, in this embodiment, the subscanning speed v is set as:

$$v = (P/60).A. \qquad (4)$$

More specifically, in this embodiment, the spot of a beam modulated by data corresponding to one pixel is formed a plurality of times on slightly deviated positions during one rotation of the rotational polygon mirror 10.

Figure 5:
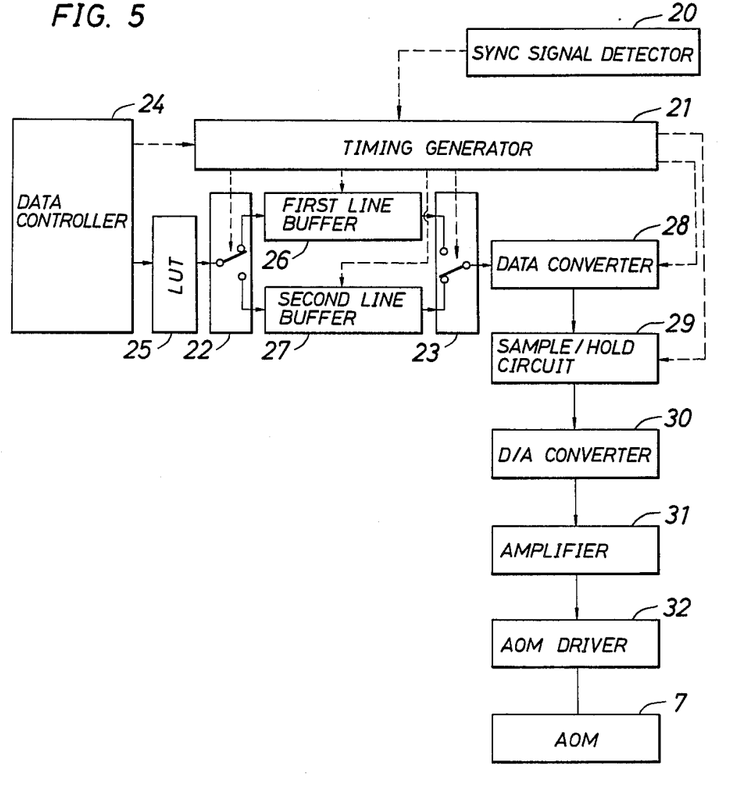
FIG. 5 is a block diagram of the image recording apparatus according to the first embodiment of the present invention.
Figure 6:
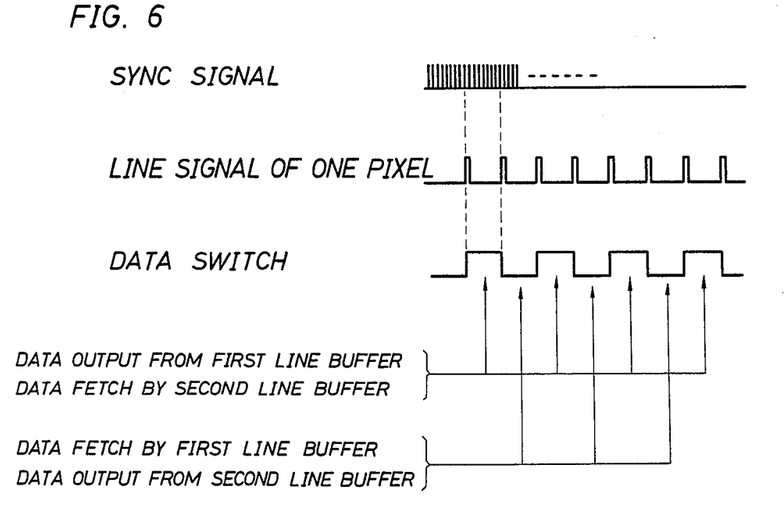
FIG. 6 shows a timing chart for explaining the operation of the circuit shown in FIG. 5.

FIG. 5 shows a circuit configuration of a case wherein the rotational polygon mirror 10 has 8 reflecting surfaces and multiple (8) scanning is performed. FIG. 6 shows a timing chart in this case.

An optical detector 17 is arranged at the outermost position of the main scanning width of the image-forming plane shown in FIG. 3. A horizontal sync signal for controlling the data recording start position is detected by the optical detector 17. The detected signal is then amplified and waveform-shaped by a sync signal detector 20 and is then input to a timing generator 21. The timing generator 21 generates a pixel clock (for a horizontal direction, i.e., main scanning direction) in synchronism with the input sync signal, and controls data switching circuits 22 and 23 in accordance with the number of scanning required for constituting a predetermined one pixel.

The pixel clock is supplied to a data controller 24, first and second line buffers 26 and 27 incorporating memories, a data converter 28, and a sample/hold circuit 29 in order to read, latch and convert the data. The data switching circuits 22 and 23 are switched every one-line multiple scanning (8 times in this embodiment).

The data switching circuits 22 and 23 always select different ones of the line buffers 26 and 27. When data stored in the line buffer 27 is output to the data converter 28 as a recording signal, as shown in FIG. 5, data supplied from the data controller 24 through a look-up table circuit 25 is written in the line buffer 26.

The data fetched by the line buffer 27 is converted by the data converter 28 to have a desired data format to be described later, and is supplied to a D/A converter 30 through the sample/hold circuit 29. An analog signal output from the D/A converter 30 is supplied to the AOM 7 through an amplifier 31 and an AOM driver 32. The AOM 7 modulates the beam as described earlier.

A case wherein 12-bit data is recorded by 8 multiple scanning and the D/A converter 30 is a 10-bit converter will be described.

When 12-bit pixel data is read out from the line buffer 27, the upper 10 bits are extracted as valid bits by the data converter 28. Also, the lower 2 bits are converted as reference bits in accordance with the 8 reflecting-surface signals of the rotational polygon mirror 10 using the truth table below, and are added to the 10-bit signal.

| (Reflecting Surface Signal) Data | 00 | 01 | 10 | 11 |
|---|---|---|---|---|
| 0 | 0 | 0 | 0 | 0 |
| 1 | 0 | 1 | 1 | 1 |
| 2 | 0 | 0 | 0 | 1 |
| 3 | 0 | 0 | 1 | 1 |
| 4 | 0 | 0 | 0 | 0 |
| 5 | 0 | 1 | 1 | 1 |
| 6 | 0 | 0 | 0 | 1 |
| 7 | 0 | 0 | 1 | 1 |

Figure 7:
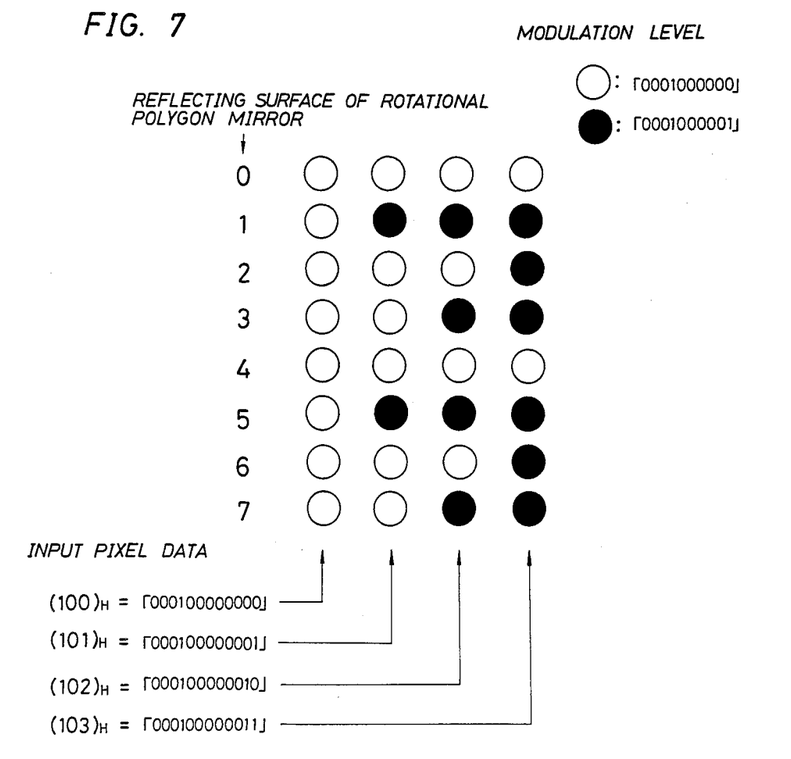
FIG. 7 is a view for explaining the halftone representation in the first embodiment of the present invention.

With this truth table, the upper 10-bit data is changed in accordance with the relationship between the lower 2-bit data and the reflecting surfaces of the rotational polygon mirror 10. FIG. 7 shows this relationship. Referring to FIG. 7, ○ and ● represent 10-bit modulation levels, respectively, and hence "0001000000" and "0001000001", respectively. The 12-bit input pixel data $(100)_H$, $(101)_H$, $(102)_H$, and $(103)_H$ shown in FIG. 7 are respectively represented as:

$(100)_H$ = "000100000000"
$(101)_H$ = "000100000001"
$(102)_H$ = "000100000010"
$(103)_H$ = "000100000011"

A case wherein input pixel data $(102)_H$ among the above data is recorded will be described. The lower 2 bits of this data is "10". When "10" is converted using the truth table shown above, it is alternately "0" and "1" for the adjacent reflecting surfaces of the rotational polygon mirror. Therefore, the upper 10-bit data of data $(102)_H$ is alternately "0001000000" and "00010000001" for the adjacent reflecting surfaces of the rotational polygon mirror. In other words, a corresponding pixel of the data is recorded 8 times alternately as ○ in the first scanning, ○ in the second scanning, ● in the third scanning,....

From the above description, 12-bit gray levels can be obtained by multiple scanning using a 10-bit signal.

The number X of gray levels obtained by multiple scanning is expressed as follows:

$$X = (k-1) \cdot n + 1 \quad (5)$$

where k is the number of modulation levels (the number of original gray levels) and n is the number of multiple scanning.

Therefore, in this embodiment, since the number of modulation levels is 2, i.e., ○ and ● and the number of multiple scanning, i.e., the number of the reflecting surfaces of the rotational polygon mirror to be used is 8, the maximum number of the gray levels which can be obtained in practice is 9 (=(2−1)×8+1), and the number of gray levels is greatly increased.

In the above embodiment, subscanning, e.g., conveyance of the recording medium is performed continuously. However, it can be performed intermittently. More particularly, when the recording medium is conveyed for a distance corresponding to one pixel in the subscanning direction, the recording material can be stopped and one line of the original can be recorded 8 times by multiple recording and, when the 8-times multiple recording has been completed, the recording medium can be conveyed again for another distance corresponding to another one pixel.

A relationship among the scanning pitch, pixel pitch, and the spot size of the laser beam scanning the recording medium in the subscanning direction will be described. In this embodiment, multiple scanning is performed 8 times to constitute one-line pixels. When subscanning is performed continuously, the following relation is established between the scanning pitch $P_S$ and the pixel pitch $P_D$ of the multiple scanning as:

$$8P_S = P_D \quad (6)$$

When subscanning is performed intermittently, the following relation is established as:

$$P_S = 0 \quad (7)$$

When a spot size S is defined at such a value at which the light intensity is $1/e^2$ the central light intensity, the spot size S is selected to be substantially equal to or smaller than the pixel pitch $P_D$, and the following relation is established between S and $P_D$ as:

$$S = P_D \text{ or } S < P_D \quad (8)$$

Also, $$S > P_S \quad (9)$$

These relations are not limited to this embodiment. However, in order to obtain the effect of the present invention, it is preferable that a relation $$2P_S \leq S \leq P_D \quad (10)$$

is satisfied. In other words, it is preferable that the beam spot on the recording medium is superposed on more than half portion of the previous beam (on its entire portion in the case of intermittent subscanning). Therefore, it is preferable that the multiple scanning pitch is smaller than the beam spot size.

Figure 8:
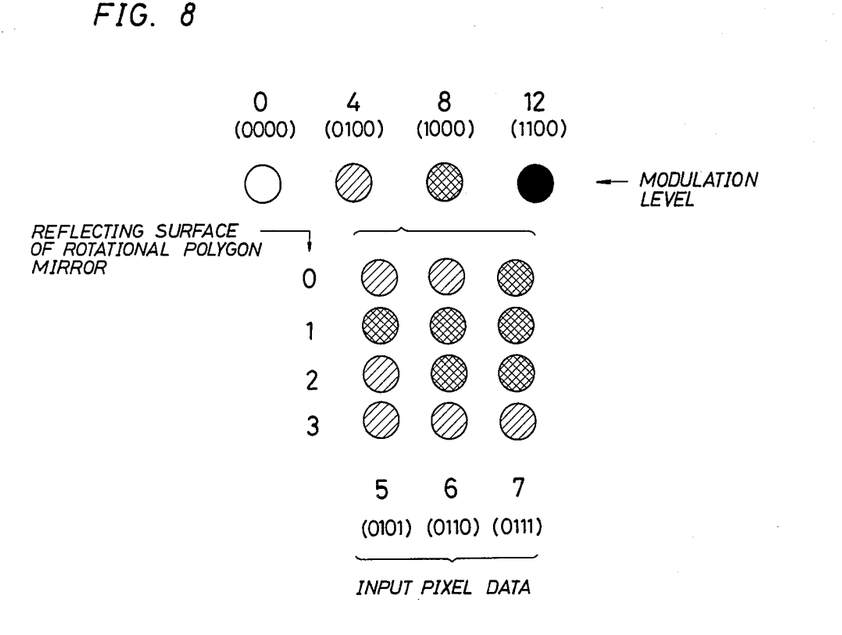
FIG. 8 is a view for explaining another halftone representation in the first embodiment of the present invention.

FIG. 8 shows a case wherein the number of modulation levels is 4 and multiple scanning is performed 4 times. In this case, the number of gray levels is "(4−1)× 4+1=13" from equation (5), so that 13 gray levels can be obtained.

For example, when original modulation levels 4 and 8 are employed, 5 gray levels can be obtained. As a result, gray levels 5, 6, and 7 can be additionally obtained between the gray levels 4 and 8. This can be applied to another pair of adjacent modulation levels. In the case of FIG. 8, the upper 2-bit data (4 types of modulation levels) is fixed and the lower 2-bit data is changed so as to realize intermediate gray levels between adjacent modulation levels.

A second embodiment of the present invention will now be described.

Figure 9:
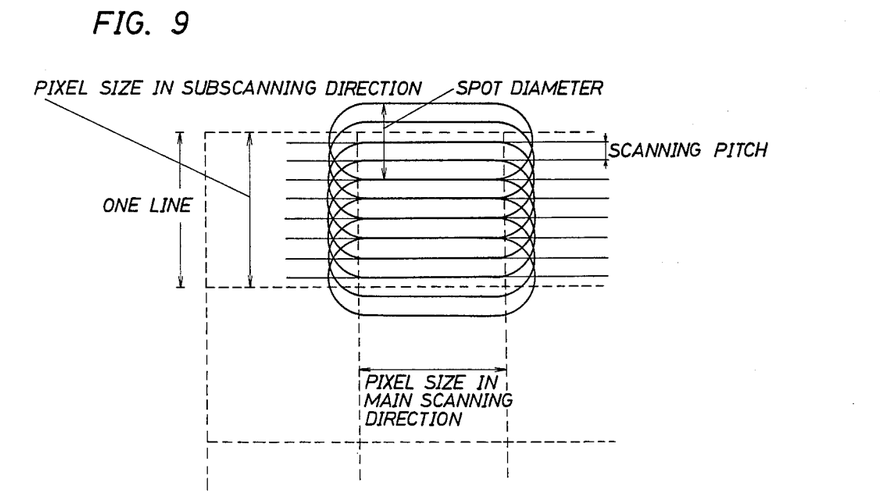
FIG. 9 is a view for explaining subscanning in an image recording apparatus according to a second embodiment of the present invention.

The recording optical system of the second embodiment is the same as that shown in FIG. 3, the circuit configuration thereof is the same as that shown in FIG. 5, and the timing chart of the circuit operation is the same as that shown in FIG. 6. In the second embodiment, the beam spot size on the recording medium is selected to be substantially equal to or smaller than the pixel pitch of the subscanning direction, and to be larger than the scanning pitch. FIG. 9 shows a relationship among the spot size (in this case, half the pixel size=scanning pitch x 4 . . .), pixel size in the subscanning direction, pixel size in the main scanning direction, and scanning pitch.

The circuit operation of the second embodiment is the same as that described as the circuit operation shown in FIG. 5.

Figures 10A, 10B:
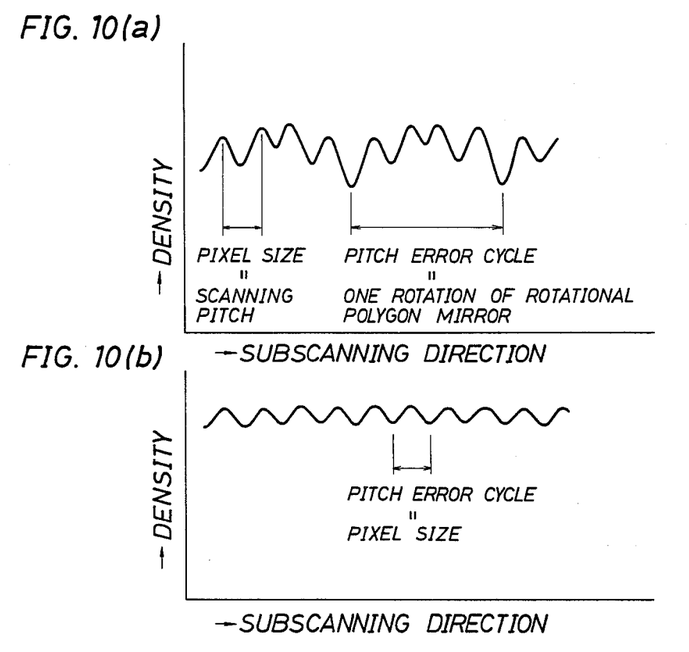
FIGS. 10(a) and 10(b) are graphs, respectively, showing density patterns along the subscanning directions for recording in the second embodiment of the present invention.

FIG. 10(a) shows a density pattern of an image in the subscanning direction recorded by a conventional recording apparatus. It can be seen from FIG. 10(a) that the position of the scanning beam varies in the subscanning direction by the influence of the inclination angle error of the rotational polygon mirror, and that the density pattern cyclically changes thereby, resulting in a pitch error. The pitch error occurs every other rotation of the rotational polygon mirror. FIG. 10(a) shows the pitch error of a rotational polygon mirror having 4 reflecting surfaces. Usually, the pitch error cycle is about 0.3 to 1.0 mm and stands out.

FIG. 10(b) shows a density pattern of an image in the subscanning direction recorded by the apparatus according to the second embodiment of the present invention. The density error cycle due to the inclination angle error is equal to the pixel size and is no longer a pitch error. In addition, since the density error cycle is usually less than 0.1 mm, it does not pose any practical problem.

Figure 11:
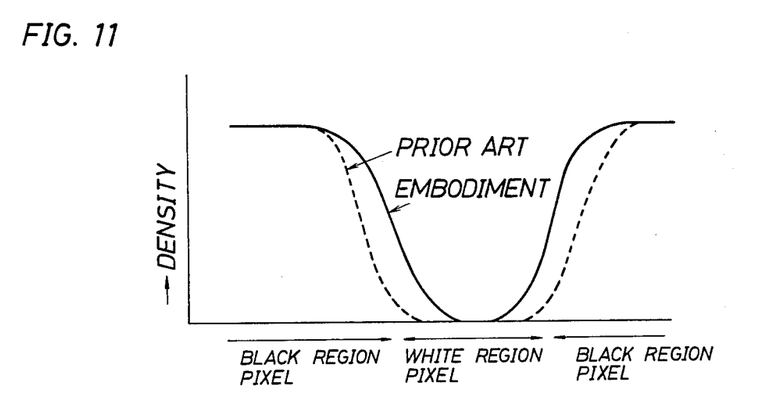
FIG. 11 is a graph showing a density pattern when a black-and-white pattern is recorded for every other pixel.

In the second embodiment, however, a problem of degradation in the MTF (modulation transfer function) exists. This problem can be attributed to thickening of a line due to the influence of the inclination angle and blurring of the edge due to the influence of the multiple scanning. FIG. 11 shows a density pattern when a black-and-white ( ○, ● ) pattern is recorded for every other pixels. As is apparent from FIG. 11, when this pattern is scanned with a beam having the same spot size, a line thickening occurs in the second embodiment, as compared to the conventional case (indicated by a broken line) wherein one scanning is performed to correspond to one pixel.

However, line thickening can be decreased to a considerable degree by reducing the spot size (in the subscanning direction). Conventionally, when the spot size is reduced, variation occurs in the density of each scanning line. Such problem can be minimized in this embodiment. This is because even if the spot size is reduced as compared to the pixel size in the subscanning direction, it is sufficiently larger than the scanning pitch.

Figure 12A:
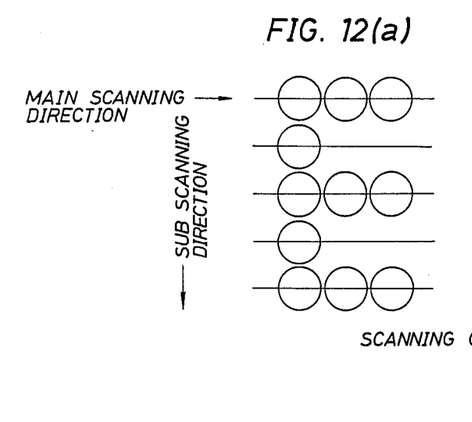
FIG. 12(a) shows a normal case without any inclination angle error.
Figure 12B:
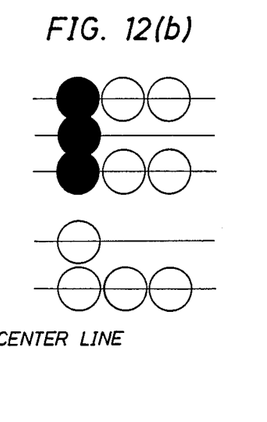
FIG. 12(b) shows a case with an inclination angle error.
Figures 12C, 12D:
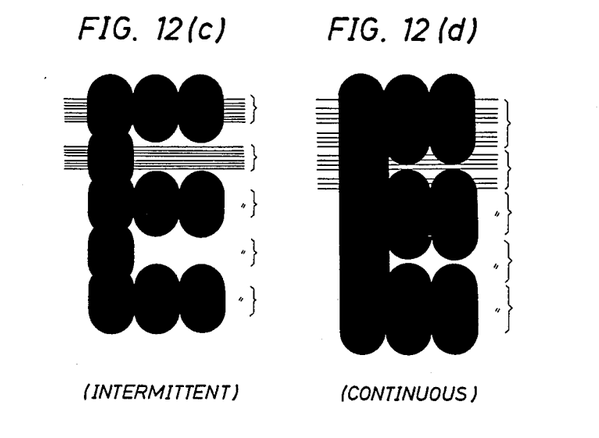
FIGS. 12(c) and 12(d) show cases of multiple scanning in the second embodiment of the present invention.

The above description has been made for a case wherein a halftone image is recorded mainly (the present invention is more effective in this case). However, the present invention has the following advantages in the case of binary image recording. FIGS. 12(a) to 12(d) show binary image recording, in which FIG. 12(a) shows a character dot pattern without any inclination angle error, FIG. 12(b) shows a character dot pattern having an inclination angle error (a maximum of about ½ pixel), and FIGS. 12(c) and 12(d) show character dot patterns obtained by multiple scanning and having an inclination angle error.

More particularly, FIG. 12(c) shows a case of intermittent subscanning (conveyance) wherein the subscanning speed during multiple scanning is greatly smaller than that during conveyance of the recording medium for next image data recording, and FIG. 12(d) shows a case of continuous subscanning (i.e., constant convey speed of the recording medium).

In FIGS. 12(c) and 12(d), dots are enlarged in the subscanning direction, and characters can be recognized more easily than in FIG. 12(b). In the continuous subscanning of FIG. 12(d), the scanning lines of adjacent pixels may overlap each other depending on the spot size and the scanning pitch.

Figure 13A:
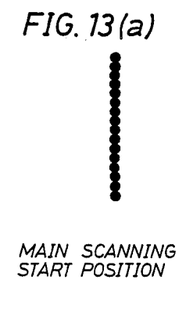
FIGS. 13(a), 13(b), and 13(c) show jitters, respectively.
Figure 13B:
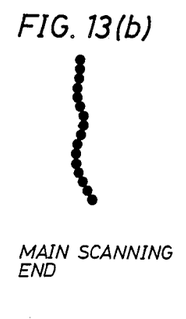
Figure 13C:
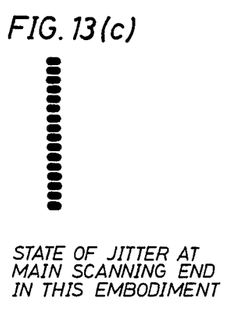

A rotational polygon mirror has a variation called jitter in the motor rotation. Jitter components are large at every other rotation and conventionally a jitter component as shown in FIG. 13(b) is often observed. However, when one rotation of the rotational polygon mirror constitutes one pixel, as in the embodiment, the influence of the jitter is absorbed as a blurring in the main scanning direction, as shown in FIG. 13(c), so that no practical problem occurs.

In this embodiment, subscanning (conveyance of the recording medium) is preformed continuously. However, conveyance of the recording medium can be stopped when it is conveyed in the subscanning direction for a distance corresponding to one pixel, scanning can be performed a plurality of times for multiple recording at that position, and the recording medium can be conveyed again when recording is completed.

In the above description, scanning corresponding to one rotation of the rotational polygon mirror constitutes one pixel, so that the influence of an inclination angle error of the mirror can be prevented. As mentioned above, the relationship between the number of reflecting surfaces of the rotational polygon mirror and the number of multiple scanning is optimally equal to each other. In this case, the pitch error due to the inclination angle error is theoretically removed. However, even when multiple scanning is performed 4 times using a rotational polygon mirror having 8 reflecting surfaces, it does not pose any practical problem. This is because the pitch error cycle becomes fine because of multiple scanning (the pitch error cycle is ½ in 8 multiple scanning). In this manner, when the pitch error cycle due to the inclination angle error is set to be below about 0.2 mm, even if one rotation of the polygon mirror does not correspond to one pixel, no practical problem occurs unless a magnifier is used for observation. This applies to a galvanometer mirror whose inclination angle cycle is indefinite.

Figure 14:
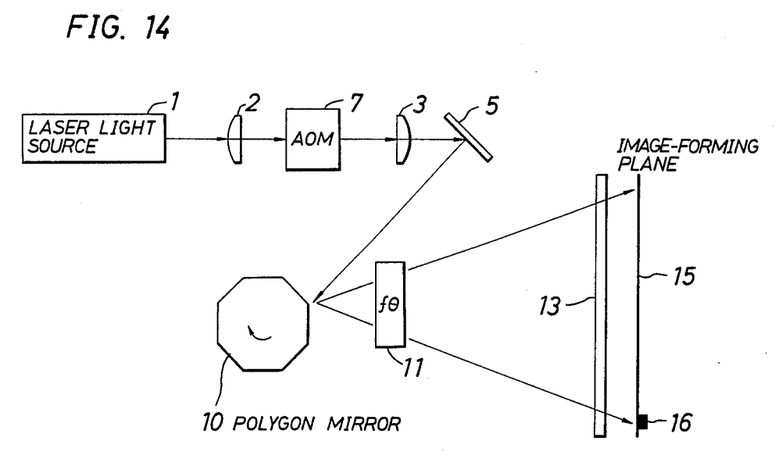
FIG. 14 is a schematic diagram of an optical system of an image recording apparatus according to a third embodiment of the present invention.

FIG. 14 shows a third embodiment of the present invention. Referring to FIG. 14, an elongated cylindrical lens 13 is arranged between an image-forming plane 15 and an fθ lens 11. The position of the cylindrical lens 13 is determined between a position at which the image-forming plane 15 and the reflecting surface of a rotational polygon mirror 10 are conjugate with each other, and a position at which the output port of a laser light source 1 and the image-forming plane 15 are conjugate with each other.

A laser beam tends to be slightly bent in the vicinity of the output port or midway along its optical path. This is attributable to a difference in the expansion ratio of a laser tube according to temperature, or a small change in a reflectance of air due to wind or heat convection. Even a slight fluctuation in the beam can degrade the image quality. The influence of the beam fluctuation differs according to the type of laser head, the position of an optical system, or environmental conditions, and generates an irregular pitch error, although it is not so outstanding as that due to the inclination angle error of the rotational polygon mirror. Such irregular pitch error leads to a considerable degradation in quality of a halftone image.

When the beam is bent in the scanning direction in the vicinity of the rotational polygon mirror, this phenomenon is substantially equivalent in principle to the influence of an inclination angle error. Therefore, the fluctuation in the beam can be corrected by arranging the cylindrical lens 13 at the position mentioned above, so that a high-quality image without pitch error due to the fluctuation can be obtained.

Fluctuation can occur in any portion along the optical path of the beam (especially in the vicinity of the output port and the rotational polygon mirror), and cannot be corrected completely with only a single cylindrical lens 13.

However, the influence of beam fluctuation is smaller than that of the inclination angle of the polygon mirror. Even if the fluctuation cannot be corrected completely, it does not pose any serious problem. The cylindrical lens 13 may be arranged at a position for correcting a largest fluctuation among the fluctuations occurring at various positions. Even when the lens 13 is arranged at such a position, the inclination angle error may not be completely corrected. However, no serious problem occurs because of the function of the multiple scanning described above. From the foregoing, it can be seen that the position of the cylindrical lens 13 need not be adjusted precisely.

The above phenomenon is associated with the subscanning direction. A similar phenomenon exists in the main scanning direction. This can be also observed as a jitter and degrades the image quality.

In a scanning system using a rotational polygon mirror, a main scanning frequency is often selected to be 200 Hz or more. The time required for scanning an effective scanning width in this case is less than 3 ms when the effective scanning ratio is 60%. In contrast to this, the frequency of the beam fluctuation is mostly below 20 to 30 Hz. Therefore, when the frequency of the main scanning is precisely synchronized with the sync signal at the scanning start position, even if beam fluctuation occurs in the main scanning direction before the beam reaches the scanning end, the influence of the beam fluctuation is substantially negligible.

If the cylindrical lens 13 is arranged as shown in FIG. 14, MTF characteristics can be improved. The lens 13 acts on the beam reflected by the rotational polygon mirror 10 in different manners in the main scanning and subscanning directions. Accordingly, the spot formed on the image-forming plane 15 is an elliptic having a major axis in the main scanning direction and a minor axis (considerably shorter than the pixel size) in the subscanning direction. Therefore, the MTF characteristics in the subscanning direction are greatly improved. In addition, the spot size in the subscanning direction is large as compared to the scanning pitch. Conventionally, since a density variation occurs in each scanning line when the spot size is reduced, the MTF characteristics are degraded. Such a conventional problem is not posed in this embodiment. Also, the lens 13 has an inclination angle correcting effect to a certain degree although not to a complete degree. Therefore, the problem of the above embodiment, i.e., thickening of a line due to the inclination angle can be eliminated.

An elongated cylindrical lens conventionally poses a problem. Although it may seem to be improper to apply such an elongated cylindrical lens as compared to the above first and second embodiments, the image quality of the third embodiment is in practice superior to those of the first and second embodiments. Therefore, an elongated cylindrical lens should be selectively used in accordance with the objects and applications of image recording apparatuses.

The advantages of the embodiment shown in FIG. 14 will be summarized as follows:

(1) The influence of beam fluctuation can be corrected by the cylindrical lens 13.

(2) Since inclination angle error correction is performed to a certain degree, scanning lines are not thickened.

(3) Even if the spot size in the subscanning direction is reduced, it does not cause a density error in each scanning direction.

(4) A cylindrical lens can be omitted from the optical path of the rotational polygon mirror on the beam-incident side.

(5) Although an elongated cylindrical lens is applied, it need not be positioned with a high precision.

(6) Even if a rotational polygon mirror has a considerably large inclination angle error, it can be used. Among the above advantages, items (2) and (3) mean an improvement in the MTF characteristics.

Figure 15:
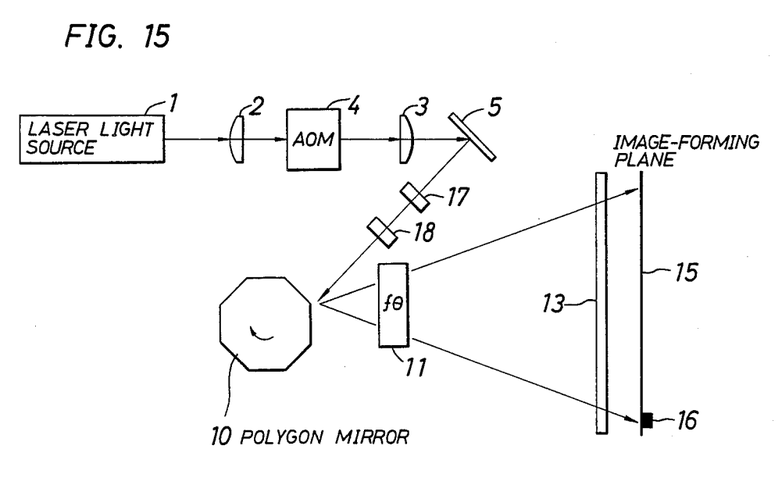
FIG. 15 is a schematic diagram of an optical system of an image recording apparatus according to a fourth embodiment of the present invention.

FIG. 15 shows an image recording apparatus according to a fourth embodiment of the present invention. Referring to FIG. 15, in addition to a cylindrical lens 13 between an image-forming plane 15 and an fθ lens 11, cylindrical lenses 17 and 18 are inserted in the optical path of a rotational polygon mirror 10 in the beam-incident side.

According to the fourth embodiment, the spot size can be increased to a certain degree in the subscanning direction, so that the depth of focus on the image-forming plane 15 can be increased. Although the optical system is the same as the conventional optical system shown in FIG. 1, it is different in that it improves the image quality and it facilitates position adjustment of the cylindrical lens 13 on the beam-output side of the rotational polygon mirror 10. Other features of the fourth embodiment are the same as the third embodiment shown in FIG. 14.

A relationship among the scanning pitch $P_S$, pixel pitch $P_D$, spot size S of the laser beam on the recording medium, and the number n of multiple scanning will be described. According to the present invention, a single pixel is formed by a plurality of times of scanning. The pitch (=pixel size) in the main scanning direction is selected to be equal to that in the subscanning direction and is a multiple of the scanning pitch by the number of multiple scanning times. When subscanning is continuous, a relation:

$$n \times P_S = P_D \quad (5)$$

is established. It is preferably that the spot size S is equal to or smaller than the pixel pitch $P_D$, and is larger than the scanning pitch $P_S$. In other words, it is preferable that a relation:

$$P_D \approx S > P_S \text{ or } P_D > S > P_S \quad (6)$$

is established.

More preferably, when an ordinary image is to be recorded, a good image quality is obtained if the above relation is modified to be:

$$P_D \geq S \geq 0.5 P_D$$

and especially $$0.5 P_D \geq S \geq s P_S = 2/n \cdot P_D \quad (7)$$

when blurring at the edge of an image must be prevented.

What is claimed is:

1. An image recording apparatus for recording a halftone image with a plurality of gray levels on a recording medium by scanning means for scanning with a light beam in scanning lines of a predetermined pitch along a main scanning direction and by moving means for relatively moving the recording medium in a subscanning direction perpendicular to the main scanning direction in pixels of a predetermined pitch for the image, wherein said scanning means comprises:
   light source means for providing a light beam of a predetermined spot size;
   deflective scanning means for deflecting the light beam to scan successive lines on the recording medium in the main scanning direction; and
   synchronizing means for synchronizing the scanning of said deflective scanning means and the movement of the recording medium by said moving means such that a plurality n' of multiple scanning lines based upon the same line image information which are slightly displaced from each other in the subscanning direction are formed in each pixel increment in the subscanning direction of the image.

2. An apparatus according to claim 1, wherein a pitch of the multiple scanning is smaller than a spot size of the modulated light on the recording medium.

3. An apparatus according to claim 1, wherein a spot size of the light used for the multiple scanning is equal to or smaller than an obtained pixel pitch, and is larger than a pitch of the multiple scanning.

4. An apparatus according to claim 3, wherein the spot size of the light is substantially equal to or smaller than twice the scanning pitch, and is equal to or larger than twice the scanning pitch.

5. An apparatus according to claim 4, wherein focusing means is arranged between said scanning means and the recording medium, and a cylindrical lens is arranged between said focusing means and the recording medium.

6. An apparatus according to claim 1, wherein focusing means is arranged between said scanning means and the recording medium, and a cylindrical lens is arranged between said focusing means and the recording medium.

7. An apparatus according to claim 6, wherein said cylindrical lens is arranged in an optical path of said scanning means on an incident side of the modulated light.

8. An image recording apparatus according to claim 1, wherein said deflective scanning means includes a rotating polygonal mirror having n reflecting surfaces which are rotated in a cycle to successively scan n scanning lines in a rotation cycle.

9. An image recording apparatus according to claim 8, wherein said rotating polygonal mirror has a pitch error due to an inclination of said rotating polygonal mirror in the subscanning direction which is equal to or less than the pixel pitch in the subscanning direction, and said n scanning lines are formed during a rotation cycle using said pitch error in the subscanning direction.

10. An image recording apparatus according to claim 8, further comprising intensity modulating means for modulating the intensity of the light beam for points on each scanning line in accordance with image data for the image to be recorded within a selected number k of modulation levels.

11. An image recording apparatus according to claim 10, wherein said number n' of scanning lines in a pixel increment is equal to the number n of reflecting surfaces of said rotating polygonal mirror, and a larger number $X = (k-1) \times n + 1$ of gray levels is obtained in a pixel increment than the number k of intensity modulation levels.

12. An apparatus according to claim 10, wherein a pitch of the multiple scanning is smaller than a spot size of the modulated light on the recording medium.

13. An apparatus according to claim 8, wherein a pitch of the multiple scanning is smaller than a spot size of the modulated light on the recording medium.

14. A method for recording a halftone image with a plurality of gray levels on a recording medium by scanning means for scanning with a light beam in scanning lines of a predetermined pitch along a main scanning direction and by moving means for relatively moving the recording medium in a subscanning direction perpendicular to the main scanning direction in pixels of a predetermined pitch for the image, comprising the steps of:
   providing a light beam of a predetermined spot size;
   deflecting the light beam to scan successive lines on the recording medium in the main scanning direction; and
   synchronizing the scanning of the scanning lines and the moving of the recording medium such that a plurality n' of multiple scanning lines based upon the same line image information which are slightly displaced from each other in the subscanning direction are formed in each pixel increment in the subscanning direction of the image.

15. An image recording method according to claim 14, wherein said deflecting step is obtained using a rotating polygonal mirror having n reflecting surfaces which are rotated in a cycle to successively scan n scanning lines in a rotation cycle.

16. An image recording method according to claim 15, wherein said rotating polygonal mirror has a pitch error due to an inclination of said rotating polygonal mirror in the subscanning direction which is equal to or less than the pixel pitch in the subscanning direction, and said n scanning lines are formed during a rotation cycle using said pitch error in the subscanning direction.

17. An image recording method according to claim 15, further comprising the step of modulating the intensity of the light beam for points on each scanning line in accordance with image data for the image to be recorded within a selected number k of modulation levels.

18. An image recording method according to claim 17, wherein said number n' of scanning lines in a pixel increment is equal to the number n of reflecting surfaces of said rotating polygonal mirror, and a larger number $X=(k-1)\times n+1$ of gray levels is obtained in a pixel increment than the number k of intensity modulation levels.

* * * * *